United States Patent
Sato et al.

(10) Patent No.: US 7,312,790 B2
(45) Date of Patent: Dec. 25, 2007

(54) INPUT APPARATUS FOR PERFORMING INPUT OPERATION CORRESPONDING TO INDICATION MARKS AND COORDINATE INPUT OPERATION ON THE SAME OPERATIONAL PLANE

(75) Inventors: Tadamitsu Sato, Fukushima-ken (JP); Katsumi Kato, Fukushima-ken (JP); Yasuji Hagiwara, Fukushima-ken (JP); Masahiro Soma, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/214,910

(22) Filed: Aug. 8, 2002

(65) Prior Publication Data
US 2003/0030628 A1   Feb. 13, 2003

(30) Foreign Application Priority Data
Aug. 10, 2001   (JP)   ............... 2001-243277

(51) Int. Cl.
*G09G 5/00*   (2006.01)
(52) U.S. Cl. .................... 345/173; 178/18.01; 715/702
(58) Field of Classification Search ................ 345/156, 345/157, 168–179; 178/18.03, 18.05, 18.06, 178/18.1; 200/512; 715/702; 379/428.03, 379/433
See application file for complete search history.

(56) References Cited

U.S. PATENT DOCUMENTS

| | | | |
|---|---|---|---|
| 4,224,615 A | | 9/1980 | Penz |
| 4,394,643 A | * | 7/1983 | Williams ..................... 341/33 |
| 4,499,343 A | | 2/1985 | Prioux et al. |
| 5,463,388 A | * | 10/1995 | Boie et al. ..................... 341/33 |
| 5,666,113 A | * | 9/1997 | Logan ......................... 341/34 |
| 5,869,790 A | | 2/1999 | Shigetaka et al. |
| 5,896,127 A | | 4/1999 | Matsufusa et al. |
| 5,909,211 A | * | 6/1999 | Combs et al. ............... 345/172 |
| 5,917,906 A | * | 6/1999 | Thornton ................ 379/433.07 |
| 5,920,310 A | * | 7/1999 | Faggin et al. ................ 345/173 |
| 5,988,902 A | * | 11/1999 | Holehan ................... 400/479.1 |
| 6,130,665 A | * | 10/2000 | Ericsson ...................... 345/173 |
| 6,204,839 B1 | | 3/2001 | Mato, Jr. |
| 6,243,080 B1 | * | 6/2001 | Molne ......................... 345/173 |
| 6,259,044 B1 | | 7/2001 | Paratore et al. |

(Continued)

FOREIGN PATENT DOCUMENTS

EP   0 421 025   10/1989

(Continued)

*Primary Examiner*—Henry N Tran
(74) *Attorney, Agent, or Firm*—Brinks Hofer Gilson & Lione

(57) ABSTRACT

An input apparatus includes a flat input device of a pressure-sensitive type or a capacitive type, and an indicator sheet on which indication marks are formed is fixed on the surface of the flat input device. A tactile-feel-generating unit is provided behind the flat input device. The tactile-feel-generating unit includes dome-shaped inversion plates which are disposed at positions corresponding to the indication marks. When one of the indication marks is pressed setting an input mode, an operation signal is generated in accordance with an item represented by the indication mark, and a tactile feel is generated by a reaction force of the corresponding inversion plate. When an indication mark is touched, while in an input mode, the control unit recognizes the resulting signal to be a coordinate data signal.

37 Claims, 8 Drawing Sheets

U.S. PATENT DOCUMENTS

| | | | |
|---|---|---|---|
| 6,373,265 B1 * | 4/2002 | Morimoto et al. | 324/686 |
| 6,388,660 B1 * | 5/2002 | Manser et al. | 345/173 |
| 6,396,483 B1 * | 5/2002 | Hiller | 345/173 |
| 6,518,958 B1 * | 2/2003 | Miyajima et al. | 345/173 |
| 6,636,203 B1 * | 10/2003 | Wong et al. | 345/173 |
| 6,704,005 B2 * | 3/2004 | Kato et al. | 345/173 |
| 6,819,316 B2 * | 11/2004 | Schulz et al. | 345/174 |
| 6,924,789 B2 * | 8/2005 | Bick | 345/168 |
| 2002/0049070 A1 | 4/2002 | Bick | |
| 2002/0054030 A1 * | 5/2002 | Murphy | 345/173 |

FOREIGN PATENT DOCUMENTS

| | | |
|---|---|---|
| EP | 0 556 999 | 2/1993 |
| EP | 0 609 021 | 1/1994 |
| EP | 1 081 922 | 3/2001 |
| GB | 2 322 008 | 8/1998 |
| JP | 09 251347 | 9/1997 |

* cited by examiner

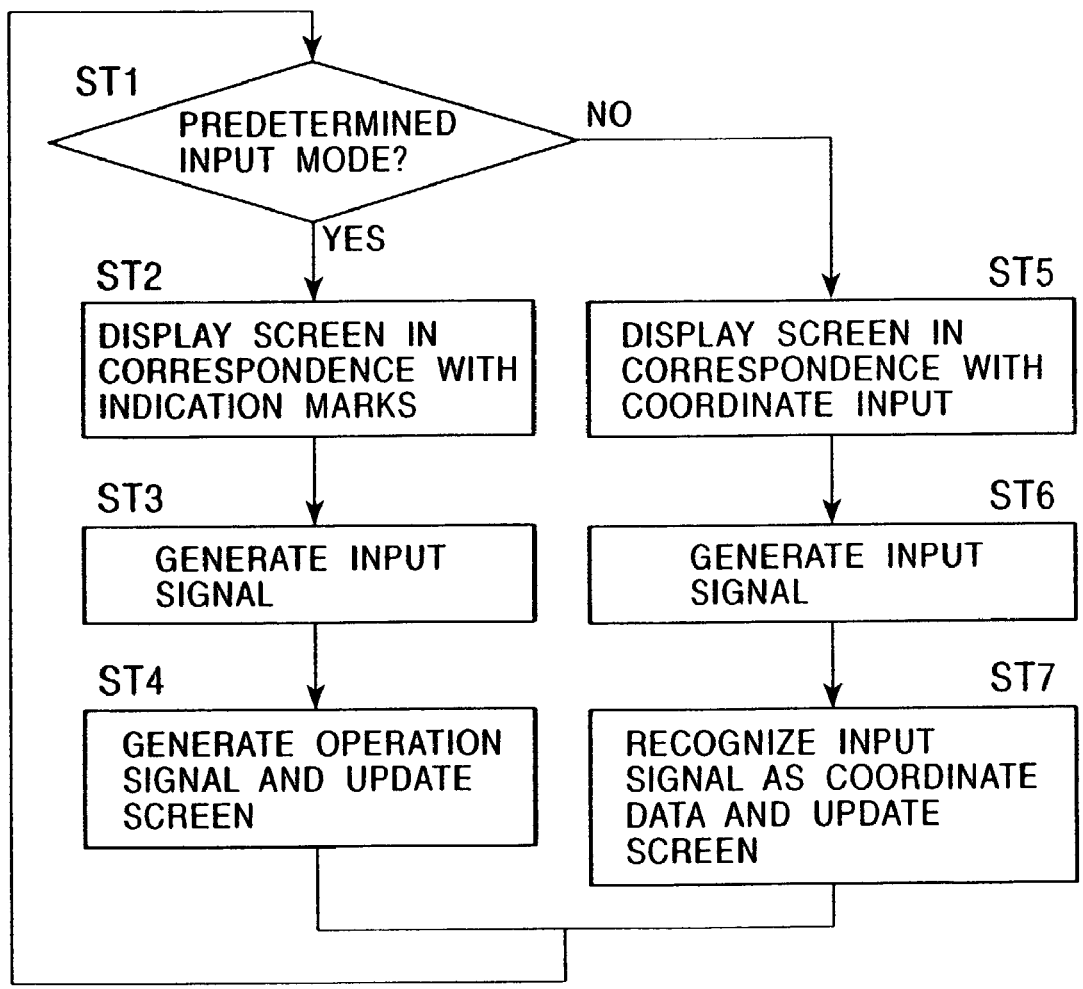

INPUT APPARATUS FOR PERFORMING INPUT OPERATION CORRESPONDING TO INDICATION MARKS AND COORDINATE INPUT OPERATION ON THE SAME OPERATIONAL PLANE

BACKGROUND OF THE INVENTION

1. Field of the Invention

The present invention relates to an input apparatus for selecting an input mode operation in which input positions shown by indication marks are selectively touched and a coordinate input operation can be performed on the same operational plane.

2. Description of the Related Art

Input apparatuses for mobile phones or the like are provided with an push-button-type input unit used for various operations, for example, for inputting telephone numbers, connecting/disconnecting lines, etc.

Recently, mobile phones have been commonly used for establishing connections to the Internet, and various kinds of services have been provided via mobile phones. Accordingly, various kinds of menus are shown on displays of mobile phones and operations of selecting from such menus are frequently performed.

In order to select an item from a menu, input apparatuses of the known art are provided with a push-type or stick-type input unit for inputting directions in addition to the above-described push-button-type input unit. The push-type or the stick-type input unit is used for moving a mark to a position indicating an item selected from a menu.

However, in input apparatuses of the known art, since the input unit for selecting an item from a menu is provided separately from the push-button-type input unit, there is a problem in that operability is degraded. In addition, since the direction in which the mark indicating the selected item is moved on a menu is limited to the vertical direction and the horizontal direction, it is difficult to quickly select an item from a menu. In addition, it is impossible to input hand-written characters by using the above-described input unit.

SUMMARY OF THE INVENTION

In order to overcome the above-described problems, an object of the present invention is to provide an input apparatus in which an operation of pushing a predetermined input position, moving a cursor for selecting an item from a menu, and inputting hand-written characters can be performed without degrading the operability of the input apparatus.

In addition, another object of the present invention is to provide an input apparatus in which an operator reliably recognizes that he or she has pushed an indication mark.

According to the present invention, an input apparatus includes an input unit with which a coordinate input operation is performed and which includes indication marks which indicate a plurality of input positions, and a control unit which receives an input signal from the input unit and generates an operation signal in accordance with the input signal, wherein the control unit recognizes the input signal obtained from the input unit as coordinate data, and when one of the indication marks is touched individually, the control unit generates an operation signal corresponding to an item indicated at the corresponding input position.

The input unit may include, for example, a flat input device with which the coordinate input operation is performed and the indication marks formed on the surface of the flat input device.

When a position of contact on the input unit moves, the control unit recognizes the movement of the position of contact as coordinate data.

In addition, according to the present invention, an input apparatus includes an input unit which is flat and with which a coordinate input operation is performed, indication marks which are formed on the surface of the input unit and which indicate a plurality of input positions, and a control unit which receives an input signal from the input unit and generates an operation signal in accordance with the input signal, wherein, when a predetermined input mode is set, the control unit detects that one of the input positions is touched and generates an operation signal corresponding to an item indicated at the corresponding input position, and when another input mode is set, the control unit recognizes the input signal obtained from the input unit as coordinate data irrespective of items indicated at the input positions.

The above-described input apparatus of the present invention may also include a display unit. When the control unit recognizes the coordinate data, the display means shows a display according to the coordinate data, and when one of the indication marks is touched, the display means shows a character, a symbol, or a number corresponding to the touched indication mark.

According to the present invention, both the input operation corresponding to input positions shown by the indication marks and the coordinate input operation irrespective of the indication positions are performed on the same operational plane. Accordingly, various kinds of input operations are possible.

Preferably, the input apparatus further includes a tactile-feel-generating unit which generates a reaction force when one of the indication marks is pushed.

The tactile-feel-generating unit may include multiple tactile-feel-generating members which are disposed at positions corresponding to the indication marks, or be formed of a single tactile-feel-generating member disposed behind the input unit.

The tactile-feel-generating members may be formed of dome-shaped inversion plates placed behind the input unit.

Accordingly, the operator reliably recognizes that he or she has pushed the indication mark, so that input failure due to insufficient pressing force can be prevented and the input operation can be reliably performed.

In addition, the inversion plates may also serve to generate a switch input.

In such a case, since the switch input is not generated until one of the inversion plates is inverted, input operation does not occur by merely touching the indication marks.

According to the present invention, both an operation for generating an operation signal corresponding to the input positions and an operation for generating coordinate data are performed on the same operational plane. Accordingly, the operability is not degraded and input operations can be performed quickly.

In addition, since the reaction force generated when one of the indication marks are pushed is transmitted to the operator, the operator reliably recognizes that he or she has pushed the indication mark. Accordingly, operational mistakes can be reduced.

BRIEF DESCRIPTION OF THE DRAWINGS

FIGS. 2A and 2B are sectional views of FIG. 1 cut along line II-II, wherein FIG. 2A shows a state in which the input apparatus is not operated and FIG. 2B shows a state in which the input apparatus is being operated;

FIG. 5 is a flowchart of an input-mode switching process;

FIGS. 9A and 9B are sectional views of FIG. 8 cut along line IX-IX, wherein FIG. 9A shows a state in which the input apparatus is not operated and FIG. 9B shows a state in which the input apparatus is being operated.

DESCRIPTION OF THE PREFERRED EMBODIMENTS

Figure 1:
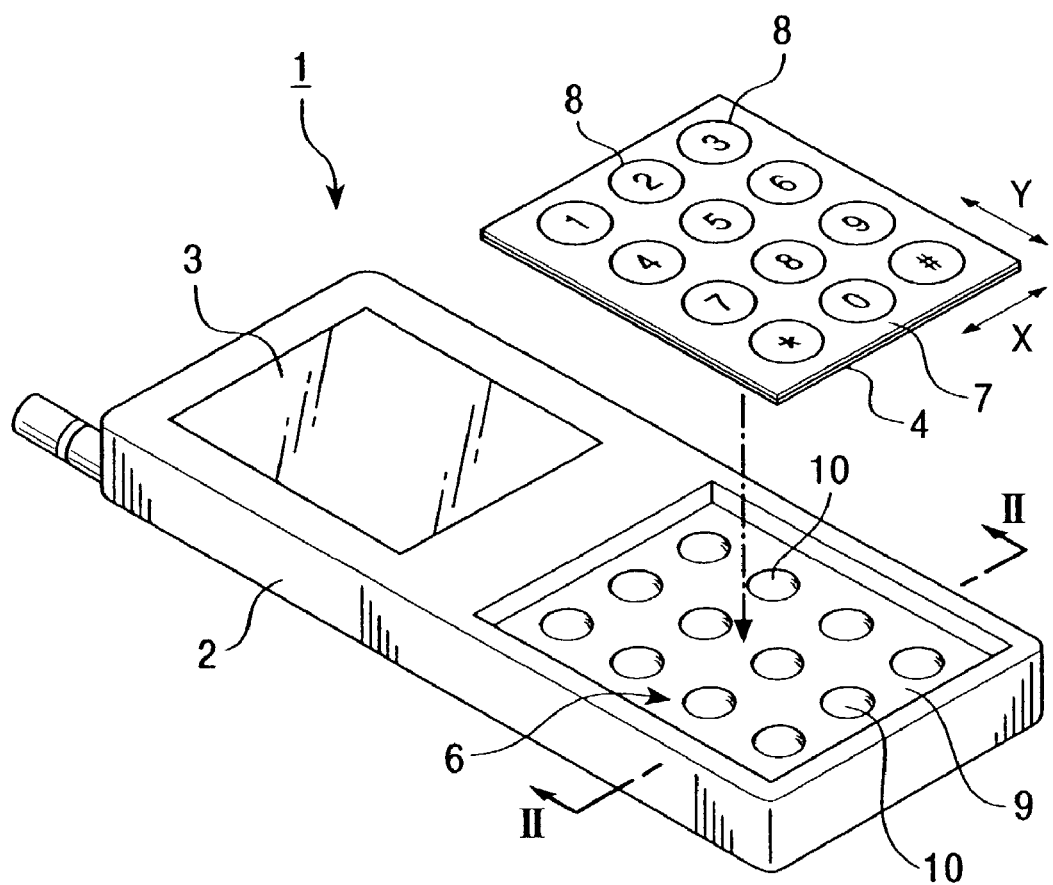
FIG. 1 is an exploded perspective view of an input apparatus according to a first embodiment of the present invention.
Figure 2A:
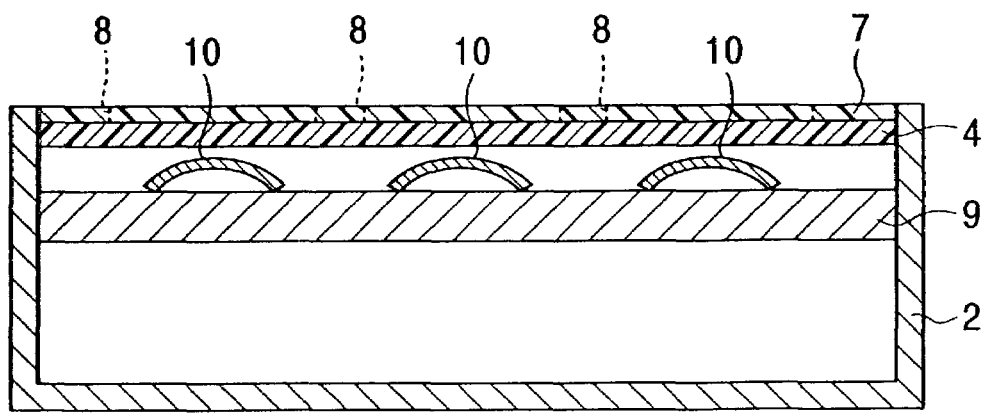
Figure 2B:
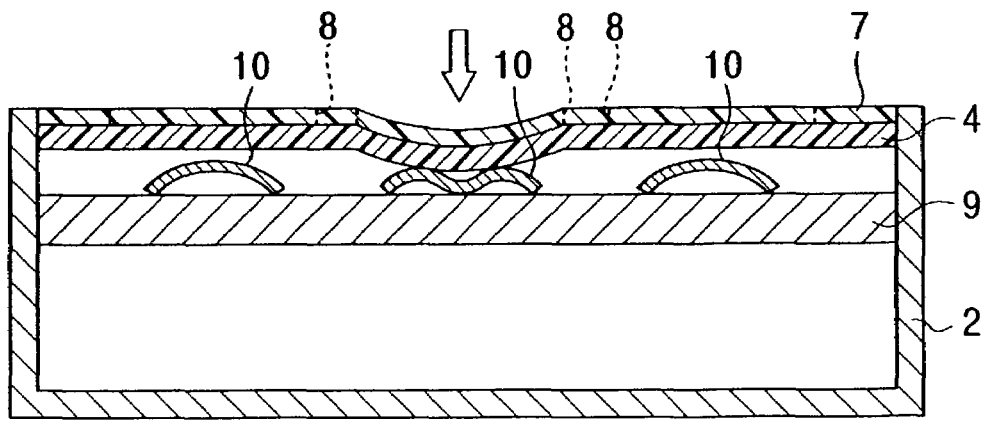
Figure 4:
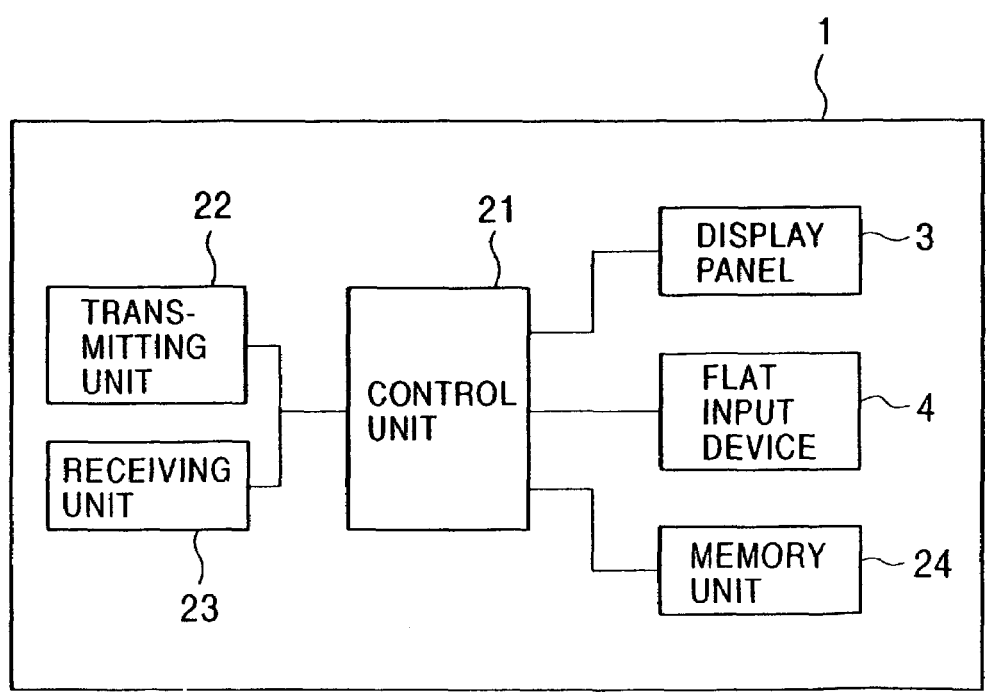
FIG. 4 is a functional block diagram of the input apparatus.
Figure 6A:
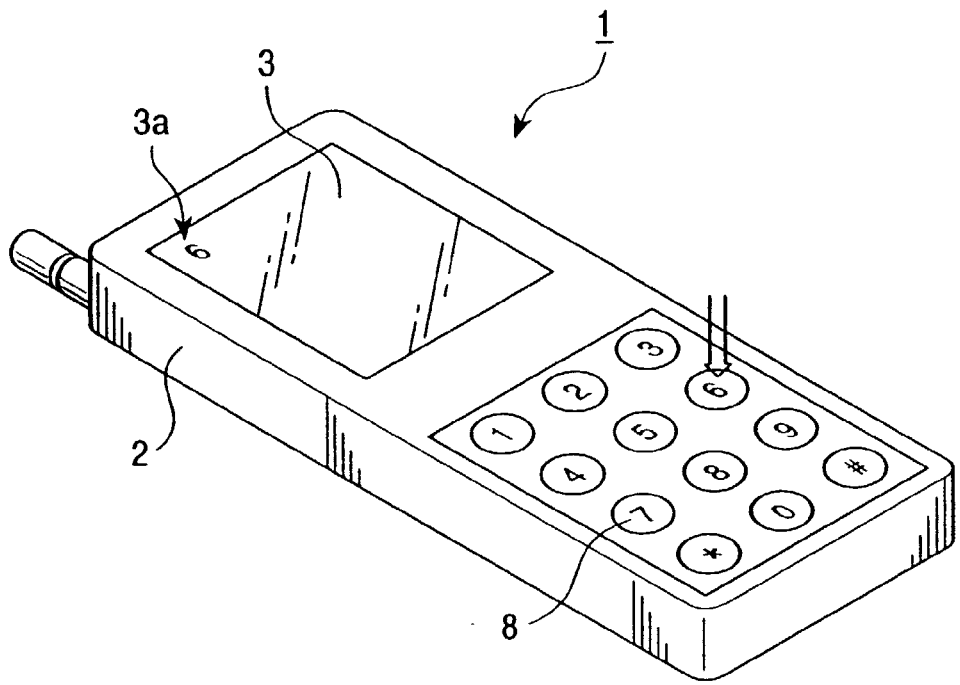
FIGS. 6A and 6B are perspective views showing examples of input operations.
Figure 6B:
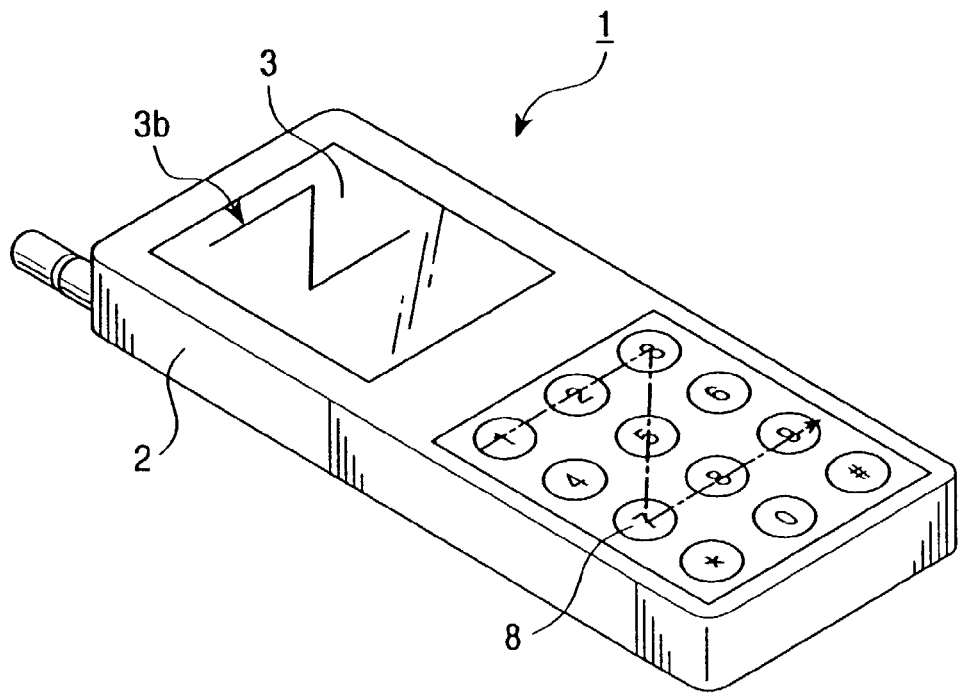

FIG. 1 is an exploded perspective view of an input apparatus according to a first embodiment of the present invention. FIGS. 2A and 2B are sectional views of FIG. 1 cut along line II-II, wherein FIG. 2A shows a state in which the input apparatus is not operated and FIG. 2B shows a state in which the input apparatus is being operated. FIG. 4 is a functional block diagram of the input apparatus according to the present invention, and FIG. 5 is a flowchart of an input-mode switching process. FIGS. 6A and 6B are perspective views showing examples of input operations.

In an input apparatus 1 shown in FIG. 1, which is formed as a mobile phone, a display panel 3 which serves as a display unit and an input unit are mounted on a housing 2. The display panel 3 is formed of a monochrome or color liquid crystal panel or of an electroluminescent (EL) panel.

The input unit includes a flat input device 4. The flat input device 4 is of a capacitive type or a pressure-sensitive type, and a coordinate can be input by using the flat input device 4. When the flat input device 4 is of the capacitive type, an X-direction detection electrode and a Y-direction detection electrode, both of which are formed of Ag (silver) paste, are disposed such that they oppose each other in a matrix pattern with a resin sheet therebetween. The resin sheet is formed of, for example, polyethylene terephthalate (PET) which is insulative and has a predetermined dielectric constant. The flat input device 4 is constructed such that it can be bent by disposing the resin sheet and the electrodes on a substrate on which a conductive pattern is formed. Accordingly, when a dielectric member, for example, a finger, touches the surface of the flat input device 4, a coordinate can be input.

Alternatively, when the flat input device 4 is of the pressure-sensitive type, a resistor having a potential difference in the X and Y directions and a conductor are disposed such that they oppose each other. When the flat input device 4 is pushed by, for example, a finger, the conductor and the resistor come into contact with each other, causing a change in resistance. In this way, a coordinate is input.

In addition, the input apparatus 1 also includes a indicator sheet 7 which is laminated and fixed on the surface of the capacitive type or the pressure-sensitive type flat input device 4 (see FIGS. 1, 2A, and 2B). The indicator sheet 7 is formed of a resin such as PET, a silicone rubber, etc., and indication marks 8 are formed on the surface of the indicator sheet 7 by printing or transferring so as to indicate input positions corresponding to a plurality of characters, numbers, symbols, etc. The indication marks 8 are provided within circular lines which define the input positions, characters, numbers and symbols. The input positions, characters, number and symbols are formed inside the circular lines by printing or transferring.

The indicator sheet 7 may be formed in a shape having concavities and convexities such that regions at which the indication marks 8 are disposed protrude upward. Alternatively, as shown in FIG. 3, projecting members 8A formed of rubber or the like may be attached onto the surface of the indicator sheet 7, and characters, numbers, symbols, etc., may be formed on the surface of the projecting members 8A by printing or transferring.

A tactile-feel-generating unit 6 is disposed behind the flat input device 4. The tactile-feel-generating unit 6 includes a base 9 which is formed of a glass-epoxy resin or a metal and disposed inside the housing 2 and dome-shaped (diaphragm-like) inversion plates 10 which are arranged on the base 9. The inversion plates 10 are placed at positions corresponding to the indication marks 8.

Figure 3:
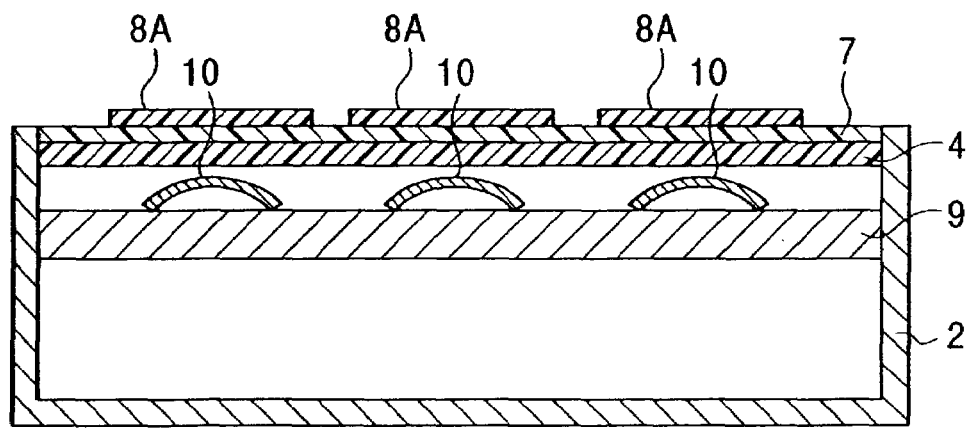
FIG. 3 is a sectional view similar to FIG. 2A in which projecting members are provided as indication marks.

In a state shown in FIGS. 2A and 3, which is a state in which the input apparatus 1 is not operated, neither the flat input device 4 nor the indicator sheet 7 is deformed. In addition, in this state, the dome-like shapes of the inversion plates 10 are maintained. In this state, when a desired indication mark 8 is pushed from above by a finger, a pen, or the like, both the flat input device 4 and the indicator sheet 7 are deformed and are bent inward, as show in FIG. 2B. Accordingly, the corresponding inversion plate 10 is inverted by the pushing force, so that a reaction force is produced by the inversion plate 10. This reaction force is transmitted to the operator's finger as a tactile feel, so that the operator reliably recognizes that he or she has pushed the indication mark 8.

As shown in FIG. 4, the input apparatus 1 includes a control unit 21, and the display panel 3 and the flat input device 4 are connected to and controlled by the control unit 21. In addition, a transmitting unit 22, a receiving unit 23, and a memory unit 24 are also connected to the control unit 21. The transmitting unit 22 and the receiving unit 23 are used for communicating sound signals and data signals with the external environment, and the memory unit 24 is used for storing phone-number data, various set data, and data to be displayed on the display panel 3, etc.

The control unit 21 is able to set two different types of input modes: a predetermined input mode (an indication-mark input mode) which is selected when input positions shown by the indication marks 8 are pushed individually by a finger or the like and the other input mode, which is a coordinate input mode. When, for example, one of the indication marks 8 is pushed for a predetermined time interval, it is determined that the predetermined input mode (indication-mark input mode) is set. In this mode, an input signal corresponding to an item represented by the indication mark 8 is generated, and an operation signal corresponding to a character, a number, or a symbol is generated on the basis of the input signal.

In addition, when the position at which a finger or the like touches the flat input device 4 is moved before the predetermined time interval elapses, it is determined that the other input mode (coordinate input mode) is set. In this case, coordinate data corresponding to the movement of the finger on the surface of the flat input device 4 is generated, and an operation signal is generated on the basis of the coordinate data.

When the predetermined input mode is set, numbers, etc., are shown on the display panel 3, as shown in FIG. 6A. FIG. 6A shows a state in which a finger or the like has touched the indication mark 8 representing the number '6', so that a display 3a showing the number '6' appears on the display panel 3.

When another of the input modes is set, and a finger or the like that is touching the flat input device 4 traces a pattern, a display 3b showing a locus of the pattern that was traced by the finger or the like appears on the display panel 3, as shown in FIG. 6B. In addition, when, for example, it is recognized that the locus represents a certain character (for example, the letter 'Z'), that character (Z) appears on the display panel 3.

Alternatively, when the operator starts to move his or her finger on the flat input device 4, the display panel 3 may show a menu from which the operator is able to select or a cursor which can be moved by the operator. For example, when a homepage (a web page) of the Internet is displayed on the display panel 3, a cursor may be shown on the display panel 3 such that it can be moved freely in various directions in an X-Y plane in accordance with an input operation on the flat input device 4. When the cursor is moved to a position of an item to be selected from the menu, a determination operation is subsequently carried out. The determination operation may be executed by, for example, softly hitting (tapping) the surface of the flat input device 4 or by using an operating member provided on the housing 2 separately from the flat input device 4.

The operation of pushing one of the indication marks 8 and the above-described tapping operation are distinguished from each other on the basis of a difference between the states of input detection of the flat input device 4. For example, when the flat input device 4 is of the capacitive type, the pushing operation and the tapping operation are distinguished on the basis of a difference between changes in the capacity per unit of time. In addition, when the flat input device 4 is of the pressure-sensitive type, the pushing operation and the tapping operation are distinguished on the basis of a difference between changes in the resistance per unit of time.

In the input apparatus 1, the control unit 21 switches between the above-described predetermined input mode (indication-mark input mode) and the other input mode (coordinate input mode) by using software programs. Accordingly, input modes are automatically switched and the display panel 3 shows a display corresponding to the selected input mode.

A process performed at the control unit 21 of the input apparatus 1 will be described below.

As shown in FIG. 5, at Step 1 (ST1), it is determined whether or not the predetermined input mode, that is, the input mode corresponding to the indication marks 8, is set. When it is determined that the predetermined input mode is set, that is, when the result at ST1 is Yes, the process proceeds to ST2 and the display panel 3 shows a screen corresponding to the items represented by the indication marks 8. Then, the process proceeds to ST3, and when one of the indication marks 8 of the flat input device 4 is pushed, an input signal corresponding to the item represented by the pushed indication mark 8 is generated. Then, at ST4, an operation signal is generated on the basis of the input signal and the display panel 3 shows an updated screen in which the generated operation signal is reflected.

When the control unit 21 determines that another of the input modes is set, that is, when the result at ST1 is No, the process proceeds to ST5 and the display panel 3 shows a screen corresponding to the coordinate data, for example, a display including a selection menu or a cursor. Then, the process proceeds to ST6, and when the flat input device 4 is operated, an input signal which is irrespective of the items represented by the indication marks 8 is generated by the flat input device 4. Then, the process proceeds to ST7, and the above-described input signal is recognized as the coordinate data and the display panel 3 shows an updated screen in which the coordinate data is reflected.

The control unit 21 switches between the predetermined mode and the other mode by determining whether a finger or the like touches one of the input positions shown by the indication marks 8 for a predetermined time interval or the finger or the like moves before the predetermined time interval elapses. However, the predetermined mode and the other mode may also be switched manually by an input operation.

Although it is described above that the inversion plates 10 formed of dome-shaped metal plates are provided in the input apparatus 1 for generating a tactile feel for the operator, they may also be used for generating a switch input when they are inverted.

Figure 7:
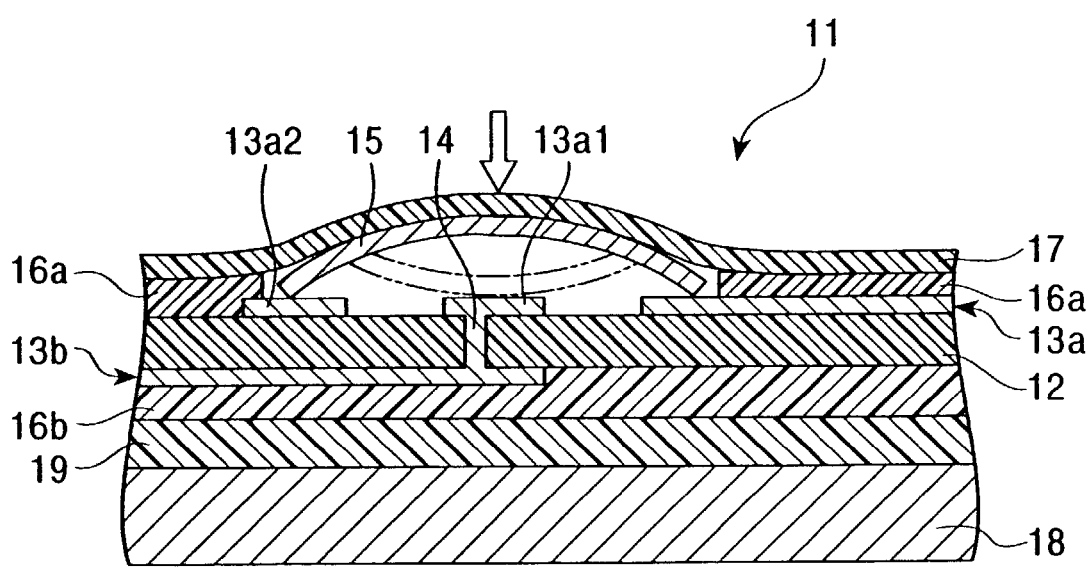
FIG. 7 is a sectional view showing another example of a tactile-feel-generating unit.

FIG. 7 shows an inversion plate which is constructed as a switching element 11 which is able to generate a switch input.

As shown in FIG. 7, the switching element 11 includes an electrode 13a and a conductive pattern 13b which are formed of Ag paste at both sides of a resin sheet 12 formed of PET. The electrode 13a and the conductive pattern 13b are formed on the resin sheet 12 by printing, etc.

The electrode 13a is formed at the top side of the resin sheet 12, and includes a circular electrode 13a1 formed at the center thereof and an annular electrode 13a2 formed around the circular electrode 13a1 with a predetermined gap therebetween. A conductive pattern is formed continuously from a part of the electrode 13a2. The conductive pattern 13b is formed at the bottom side of the resin sheet 12 and is connected to the electrode 13a1. More specifically, a through hole is formed in the resin sheet 12 at a position under the electrode 13a1, and a connecting conductor 14 which electrically connects the conductive pattern 13b and the electrode 13a1 is formed inside the through hole. In addition, a dome-shaped (diaphragm-like) inversion plate 15 is formed at the upper side of the electrode 13a2 such that the inversion plate 15 is in contact with the electrode 13a2 at the periphery thereof and the top point of the inversion plate 15 is positioned directly above the electrode 13a1.

A resist film 16a is disposed at the periphery of the inversion plate 15, and another resist film 16b is disposed under the conductive pattern 13b. A resin sheet 17 formed of PET is laminated so as to cover the entire surface of the switching element 11, and the resist film 16b is bonded to a metal base 18 with an adhesive layer 19, whereby the switching element 11 is constructed.

Switching elements constructed as described, with reference to FIG. 7, above are installed under the flat input device 4 in place of the inversion plates 10 shown in FIGS. 2A and 2B. When the, flat input device 4 is pushed from above by a finger, both the flat input device 4 and the indicator sheet 7 are deformed and the corresponding inversion plate 15 is pushed downward by the pushing force. Accordingly, the inversion plate 15 is inverted as shown by the dotted chain lines in FIG. 7, so that the inversion plate 15 comes into contact with the electrode 13a1. As a result, the electrode 13a and the conductive pattern 13b are electrically connected to each other, through the inversion plate 15, so that a switch output is changed to ON. When, for example, the switch output is turned ON, the coordinate input signal generated by the flat input device 4 is ignored and only the input from the switching element 11 is recognized by the control unit 21. In addition, when the inversion plate 15 is inverted, the reaction force generated by the inversion plate 15 is transmitted to the operator's finger as a tactile feel. On the contrary, when the switching element 11 is not operated, the input operation of the flat input device 4 is recognized by the control unit 21.

In addition, the above-described switches provided for each indication mark 8 may be connected to a single switch circuit, and the switch circuit may be constructed such that the output therefrom is set to ON when any one of the switches is pushed. In such a case, when the output from the switch circuit is turned ON, detection signals of the flat input device 4 may be ignored, that is, the mode in which only the switch input of the indication marks 8 is recognized may be selected.

Figure 8:
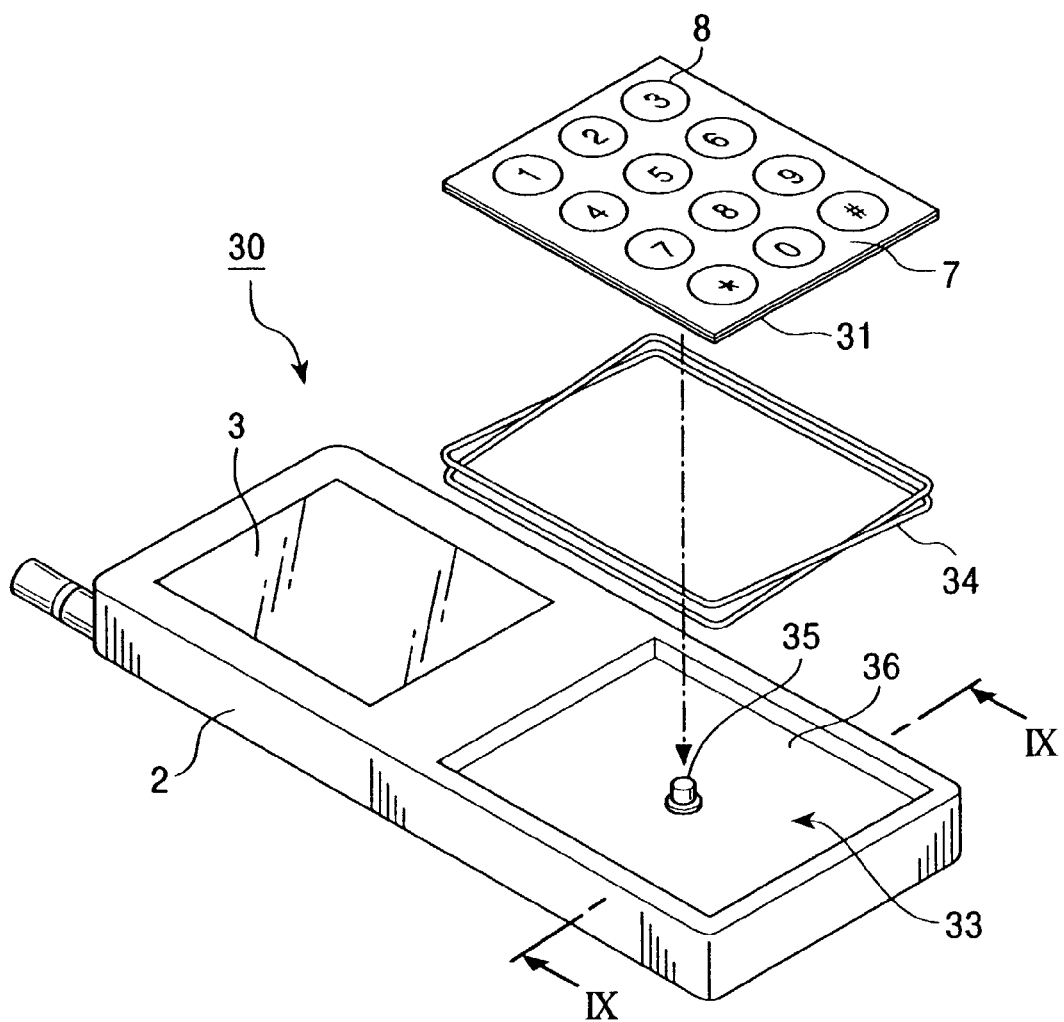
FIG. 8 is an exploded perspective view of an input apparatus according to a second embodiment of the present invention.
Figure 9A:
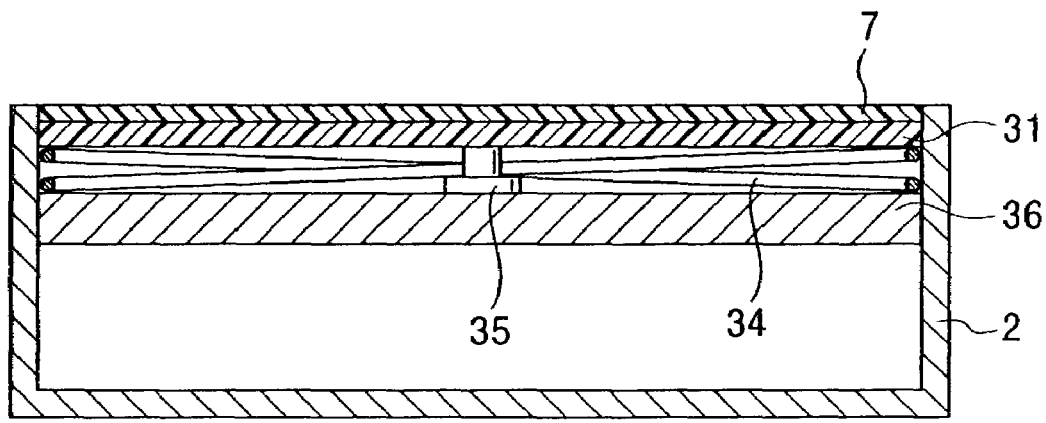
Figure 9B:
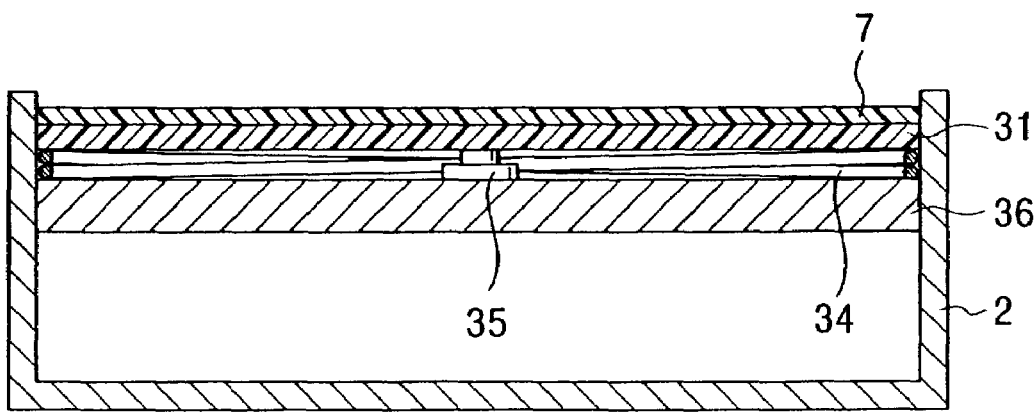

Next, an input apparatus according to a second embodiment of the present invention will be described below with reference to FIGS. 8, 9A, and 9B. FIG. 8 is an exploded perspective view of the input apparatus, and FIGS. 9A and 9B are sectional views of FIG. 8 cut along line IX-IX, wherein FIG. 9A shows a state in which the input apparatus is not operated and FIG. 9B shows a state in which the input apparatus is being operated.

In an input apparatus 30 shown in FIG. 8, which is formed as a mobile phone, a display panel 3 which serves as a display unit and an input unit are mounted on a housing 2. This input apparatus 30 includes a flat input device 31 which is different from that of the above-described input apparatus 1. Other constructions of the input apparatus 30 are similar those of the above-described input apparatus 1, and explanations thereof are thus omitted.

The flat input device 31 is of a pressure-sensitive type or a capacitive type, and an X-direction detection electrode and a Y-direction detection electrode are disposed such that they oppose each other in a matrix pattern with a resin sheet formed of polyethylene terephthalate (PET) therebetween. The resin sheet provided with the above-described electrodes are disposed on a rigid substrate formed of a glass-epoxy resin or a metal. In addition, a indicator sheet 7 which is formed similarly to the first embodiment is laminated and fixed on the surface of the flat input device 31 at the front side and a tactile-feel-generating unit 33 is disposed behind the flat input device 31.

The tactile-feel-generating unit 33 includes a projection 35 formed such that an end thereof is moveable in the vertical direction. The projection 35 is formed behind the flat input device 31 at the center of a base 36 formed as a recess in the housing 2. Thus, the input apparatus is constructed such that a tactile feel is generated by a reaction force or the like when the projection 35 is pushed from above. The tactile-feel-generating unit 33 may also be formed of the above-described dome-shaped inversion plate.

A pantograph like device 34 is disposed between the flat input device 31 and the base 36 as an elevation unit.

As shown in FIG. 8, the flat input device 31 is supported by the pantograph like device 34 such that the flat input device 31 is able to move, while being maintained horizontal, in the vertical direction. The pantograph like device 34 has parallel upper and lower contact surfaces that can move vertically relative to each other while maintaining their parallel relationship.

In the state shown in FIG. 9A, that is, in a state in which the operation is not performed, the pantograph 34 is slightly stretched upward so that the flat input apparatus 31 and the indicator sheet 7 are positioned at the upper end of the housing 2. At this time, the flat input device 31 may be raised by the elastic force applied from the protrusion 35 or by an electric member (not shown), such as a coil spring, provided on the base 36.

When the flat input device 31 is pushed at any location from above by a finger or the like, the pantograph 34 collapses and the flat input device 31 and the indicator sheet 7 are evenly pressed downward. As a result, a reaction force generated when the projection 35 is pushed is transmitted to the operator as a tactile feel, so that the operator reliably recognizes that he or she has pressed the flat input device 31.

Similarly to the input apparatus 1, the input apparatus 30 includes a control unit which switches between the predetermined input mode and the other input mode. The process of switching between the predetermined input mode and the other input mode is the same as the above-described process.

The input apparatus of the present invention is not limited to a mobile phone. For example, the input apparatus of the present invention may also be constructed such that the predetermined input mode is used for controlling a television set and the other input mode is used for controlling a game device.

What is claimed is:

1. An input apparatus comprising:
a locally deformable input unit with which a coordinate input operation and an indication mark input operation are performed and which includes indication marks which indicate a plurality of input positions, said input unit generating an input signal in response to the coordinate input operation and the indication mark input operation, the coordinate input operation and the indication mark input operation sharing an operational surface of the input unit;
a control unit which receives the input signal from the input unit and generates an operation signal in accordance with the input signal; and
wherein the control unit recognizes the input signal obtained from the input unit as coordinate data, and when one of the indication marks is touched individually, the control unit generates the operation signal corresponding to an item indicated at the corresponding input position;
wherein the control unit is capable of switching from an indication mark input operation mode to a coordinate input operation mode when an operating member does not keep contacting the indication marks for a predetermined time interval.

2. An input apparatus according to claim 1, wherein the input unit comprises a flat input device with which the coordinate input operation is performed and the indication marks formed on the surface of the flat input device.

3. An input apparatus according to claim 1, wherein when a position of contact on the input unit moves, the control unit recognizes the movement of the position of contact as coordinate data.

4. An input apparatus according to claim 1 further comprising a display panel, wherein when the control unit recognizes the coordinate data, the display panel shows a display according to the coordinate data, and when one of the indication marks is touched, the display panel shows a character, a symbol, or a number corresponding to the touched indication mark.

5. An input apparatus according to claim 1, further comprising a tactile-feel-generating unit which generates a reaction force when one of the indication marks is pushed.

6. An input apparatus according to claim 5, wherein the tactile-feel-generating unit includes tactile-feel-generating members which are disposed at positions corresponding to the indication marks.

7. An input apparatus according to claim 5, wherein the tactile-feel-generating unit includes a moveable tactile-feel-generating member.

8. An input apparatus according to claim 6, wherein the tactile-feel-generating members are formed of dome-shaped inversion plates placed behind the input unit.

9. An input apparatus according to claim 8, wherein the inversion plates serve to generate a switch input.

10. An input apparatus comprising:
a locally deformable input unit which is flat and with which a dual input mode can be set;
indication marks formed on an operational surface of the input unit which indicate a plurality of input positions;
a tactile-feel generating unit disposed underlying the operational surface of the input unit and being capable of generating a signal operable to recognize a distinction between a first input mode and a second input mode; and,
a control unit which receives an input signal from the input unit and generates an operation signal in accordance with the input signal; and
wherein in the first input mode, the control unit detects that one of the input positions is touched and generates an operation signal corresponding to an item indicated at the corresponding input position, and in the second input mode, the control unit recognizes the input signal obtained from the input unit as coordinate data irrespective of items indicated at the input positions; and
wherein the control unit is capable of switching from the first input mode to the second input mode when an operating member does not keep contacting the indication marks for a predetermined time interval.

11. An input apparatus according to claim 10 further comprising a display panel that displays a pattern traced by the operating member wherein the pattern represents a character.

12. An input apparatus according to claim 10 wherein the tactile-feel-generating unit comprises an inversion plate disposed above an electrode, the inversion plate coming into contact with the electrode upon deformation of the input unit.

13. An input apparatus according to claim 12, wherein the inversion plate is disposed at positions corresponding to each of the indication marks.

14. An input apparatus according to claim 13, wherein after the inversion plate comes into contact with the electrode, a coordinate input operation is not performed.

15. An input apparatus according to claim 10, wherein the tactile-feel-generating unit comprises a projection having a moveable end in a vertical direction.

16. An input apparatus according to claim 15, wherein the tactile-feel-generating unit further comprises an elevation unit that moves in a vertical direction.

17. A portable electronic apparatus comprising:
a locally deformable and sheet-shaped input member which is disposed under an indicator unit and which inputs a position of an operating member when the operating member comes into contact with a surface of the indicator unit, and the indicator unit includes indication marks;
a tactile-feel generating unit disposed underlying the input member and being capable of generating a switch signal; and
a control unit which generates an operation signal on the basis of a signal from the input member and which recognizes a distinction between a first input mode and a second input mode in response to the switch signal,
wherein the operating signal is generated in correspondence with a trajectory of the position of contact between the operating member and the surface of the indicator unit; and
wherein the control unit is further capable of switching from the second input mode to the first input mode when the operating member does not keep contacting the indication marks for a predetermined time interval.

18. The portable electronic apparatus according to claim 17, wherein the input member is of a capacitive type and includes a dielectric resin sheet having a detection electrode, and
wherein, when the operating member comes into contact with the surface of the indicator unit, the input member outputs a coordinate signal representing the position of contact in the first input mode.

19. The portable electronic apparatus according to claim 17, wherein the input member is of a capacitive type and includes a resin sheet having an X-direction detection electrode on one side and a Y-direction detection electrode on the other side.

20. An input apparatus comprising:
a locally deformable sheet-shaped input member which is disposed under an indicator unit and which inputs a position of an operating member when the operating member comes into contact with a surface of the indicator unit, and the indicator unit includes indication marks; and
a signal processor which processes a signal from the input member as coordinate information and which processes the signal from the input member as selection in response to a tapping of the operating member;
wherein movement position data is output when the operating member slides on the surface of the indicator unit; and
wherein the signal processor is capable of processing the signal from the input member as the coordinate information in a first input mode and information corresponding to the indication marks in a second input mode ; and
wherein the signal processor switches from the second input mode to the first input mode when the operating member does not keep contacting the indication marks for a predetermined time interval.

21. The input apparatus according to claim 20, wherein the input member is of a capacitive type and the signal processor distinguishes the tapping from a depression of the indication marks based on a difference in change of a capacity.

22. The input apparatus according to claim 20, wherein the input member is a pressure-sensitive type and the signal processor distinguishes the tapping from a depression of the indication marks based on a difference in change of a resistance.

23. An input apparatus comprising:
a dual mode input unit which is sheet-shaped and which generates a coordinate signal in a coordinate signal input mode, the input unit further generating an indication signal corresponding to a predetermined function in an indication signal input mode;
an indicator unit provided on a surface of the input unit and displaying a plurality of indication marks which indicate respective input positions; and,
a control unit which processes the coordinate signal and/or an indication signal and which switches between the coordinate signal input mode and the indication signal input mode in response to presence or absence of a touch of the indication marks by an operating member wherein the control unit switches from the indication signal input mode to the coordinate signal input mode when the operating member does not contact the indication marks for a predetermined time interval and changes the position before the predetermined time interval elapses;
wherein the input unit is locally deformable and the indicator unit is disposed on the input unit.

24. The input apparatus according to claim 23, wherein the input unit is of a capacitive type and includes a dielectric resin sheet having a detection electrode, and
wherein, in the coordinate signal input mode, when the operating member, such as a finger, presses the input unit, the input unit outputs the coordinate signal representing the position of contact.

25. The input apparatus according to claim 23, wherein the input unit is of a capacitive type and includes a resin sheet having an X-direction detection electrode on one side and a Y-direction detection electrode on the other side.

26. The input apparatus according to claim 23, wherein when the operating member, such as a finger, presses the input unit, a resistance of the input unit changes and the input unit outputs the coordinate signal representing the position at which the input unit is pressed in the coordinate signal input mode.

27. An input apparatus comprising:
a first input unit element which is sheet-shaped and which generates a coordinate signal;
an indicator unit provided on a surface of the first input unit element and displaying a plurality of indication marks which indicate respective input positions;
a second input unit element which generates an indication signal corresponding to a predetermined function; and
a control unit which processes the coordinate signal and/or the indication signal and which switches between the coordinate signal input mode and the indication signal input mode in response to presence or absence of a touch of the indication marks by an operating member,
wherein the first input unit element is locally deformable and the indicator unit is disposed on the first input unit element, and
wherein the control unit switches from the indication signal input mode to the coordinate signal input mode when the operating member is in no contact with the indication marks for the time interval.

28. The input apparatus according to claim 27, wherein each of the indication marks comprises a convex or concave portion provided on the surface of the display unit, and the character, the number, or the symbol is provided on the surface of the convex or concave portion.

29. An input apparatus comprising:
a locally deformable and sheet-shaped dual-mode input unit which generates a coordinate signal and an indication signal corresponding to the input positions;
a sheet-shaped indicating unit provided on a surface of the coordinate-input unit and comprising a plurality of indication marks indicating a plurality of input positions;
a switch-input unit which generates a switch input; and
a control unit which processes the coordinate signal and/or the indication signal, and,
wherein the indicating unit is laminated on the coordinate-input unit and the coordinate-input unit is laminated on the switch-input unit,
wherein the control unit switches from an indication signal input mode to a coordinate signal input mode when an operating member does not contact the indication marks for a predetermined time interval.

30. The input apparatus according to claim 29, wherein the switch-input unit includes a substrate having dome-shaped inversion plates and an electrode facing the inversion plates, the inversion plates generating tactile feel when the indicating unit is pressed at the input positions.

31. The input apparatus according to claim 29, wherein a switch output is turned on in response to the switch input and the control unit subsequently recognizes only the indication signal.

32. The input apparatus according to claim 29, wherein the switch-input unit provides a tactile feel when the deformed coordinate-input unit is restored.

33. The input apparatus according to claim 32, wherein upon restoration of the deformed coordinate-input unit, the control unit recognizes the coordinate signal.

34. A portable electronic apparatus comprising an input apparatus including:
a locally deformable dual mode input unit which is sheet-shaped and which generates a coordinate signal in a first input mode and which generates an indication signal corresponding to a predetermined function in a second input mode;
a display unit provided on a surface of the input unit and displaying a plurality of indication marks which indicate respective input positions;
a tactile-feel generating unit which is capable of generating a switch signal operable to switch between the coordinate signal and the indication signal; and
a control unit which processes the coordinate signal or the indication signal and the switch signal; and
a screen unit showing a cursor which moves on the screen unit or a display which corresponds to the predetermined function in response to a signal from the control unit,
wherein the display unit is laminated on the input unit, and the input unit is laminated on the tactile-feel generating unit, and
wherein the control unit switches from the second input mode to the first input mode when an operating member does not contact the indication marks for a predetermined time interval.

35. The portable electronic apparatus according to claim 34, wherein the screen unit displays a menu of items and the cursor, and an item is selected from the menu with the cursor moved by sliding an operating member, such as a finger, along the surface of the input unit.

36. The portable electronic apparatus according to claim 34, wherein the control unit outputs a first display signal and a second display signal to the screen unit, the first display signal corresponding to the coordinate signal and the second display signal representing a character, a number, or a symbol corresponding to the indication signal.

37. An input apparatus comprising:

an indicating unit which comprises a plurality of indication marks which indicates a plurality of input positions;

an input unit including a first input unit element and a second input unit element and being locally deformable and sheet-shaped, the first input unit element outputting a coordinate signal as continuous coordinate data representing the state of contact between an operating member, such as a finger, and the second input unit element outputting an indication signal corresponding to a predetermined function;

a tactile-feel generating unit which generates a signal operable to switch between a first input mode and a second input mode; and, a control unit which processes the coordinate signal and/or the indication signal; and wherein in the first input mode, the control unit detects that one of the input positions is touched and outputs an operation signal corresponding to an item indicated at the corresponding input position and in the second input mode, the control unit recognizes the input signal obtained from the input unit as coordinate data irrespective of items indicated at the input positions, wherein the control unit further switches from the first input mode to the second input mode when the operating member does not contact the indication marks for a predetermined time interval.

* * * * *